Feb. 27, 1945. K. C. D. HICKMAN 2,370,464
VACUUM DISTILLATION APPARATUS
Filed June 1, 1942 2 Sheets-Sheet 1
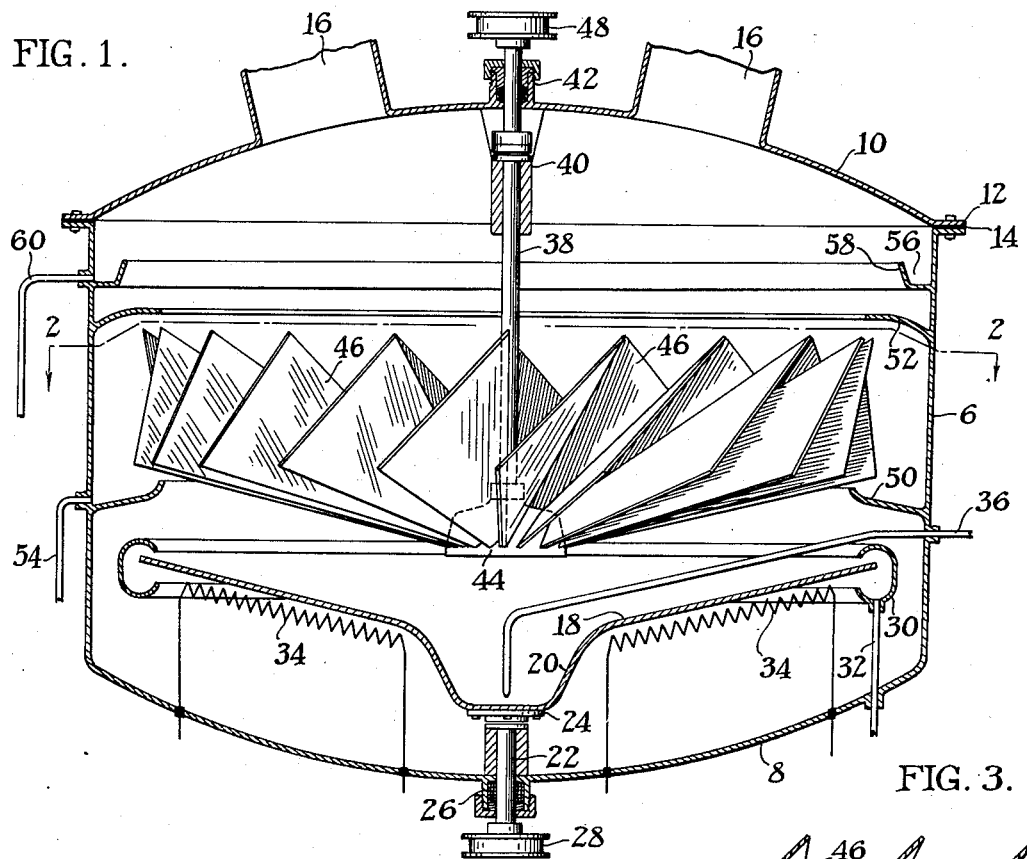
FIG. 1.
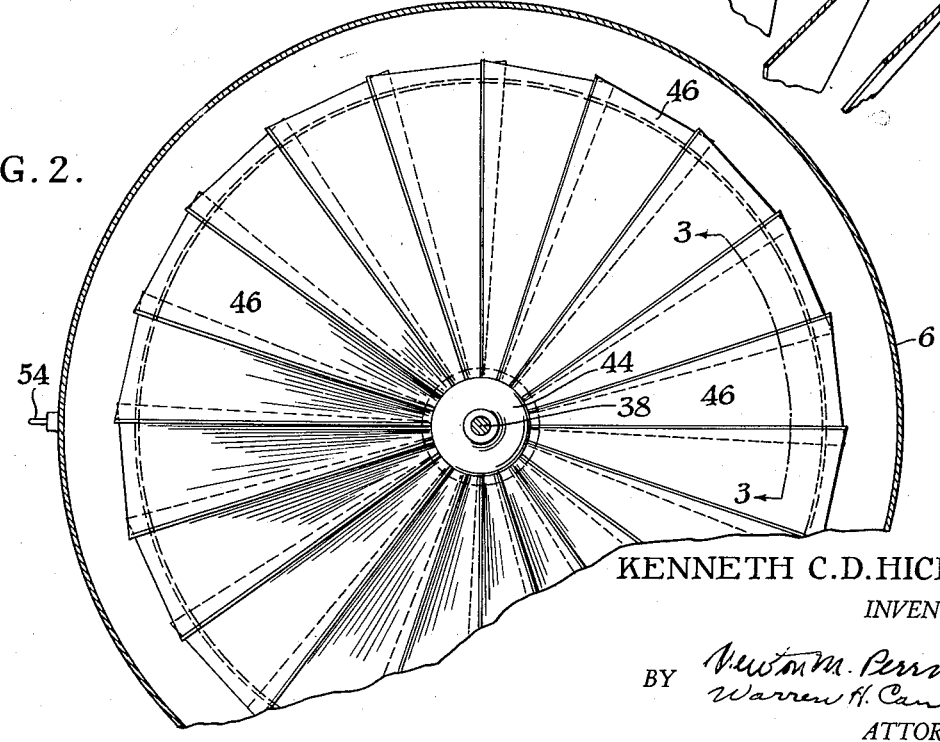
FIG. 2.
FIG. 3.
KENNETH C. D. HICKMAN
INVENTOR
BY Newton M. Perrins
Warren H. Cannon
ATTORNEYS Feb. 27, 1945.    K. C. D. HICKMAN    2,370,464
VACUUM DISTILLATION APPARATUS
Filed June 1, 1942    2 Sheets-Sheet 2

KENNETH C.D. HICKMAN
INVENTOR

BY
ATTORNEYS

Patented Feb. 27, 1945

2,370,464

UNITED STATES PATENT OFFICE 2,370,464

VACUUM DISTILLATION APPARATUS

Kenneth C. D. Hickman, Rochester, N. Y., assignor to Distillation Products, Inc., Rochester, N. Y., a corporation of Delaware Application June 1, 1942, Serial No. 445,332

8 Claims. (Cl. 202—205)

This invention relates to improved vacuum distillation apparatus; in particular the invention relates to improved fractionating high vacuum distillation apparatus in which the vaporizing and condensing surfaces are separated by space which is substantially unobstructed.

High vacuum unobstructed path distillations and apparatus are well known in the prior art. However, such distillations permit poor separation, generally less than one theoretical plate. The degree of fractionation is determined by the relative rates of vaporization of the various constituents from the distilland. Everything in the vapor phase is condensed and vapor phase fractionation is, therefore, impossible. Also molecular distillations are accompanied by high heat losses. The vaporizing and condensing surfaces are located opposite to each other; one is at an elevated temperature and the other at a low temperature. The conditions are thus optimum for heat loss from the vaporizing to the condensing surfaces. It has been suggested that the condensing surface be run at an elevated temperature in order to avoid this difficulty. However, this suggestion has not proved to be of value because the distilling vapors are not completely condensed and these uncondensed vapors cruise backwards and forwards between the evaporator and condenser and greatly hinder the distillation by their presence in the distilling gap.

This invention has for its object to avoid or minimize the foregoing difficulties. Another object is to provide improved vacuum distillation apparatus in which the fractionating power is improved in marked degree while the heat losses are reduced.

These and other objects are accomplished by my invention which includes vacuum distillation apparatus wherein there is positioned between the vaporizing and condensing surfaces a fanlike member which is substantially parallel with the vaporizing surface and which is constructed of a plurality of spaced radial vanes oblique to the vaporizing surface or surface of the distilland. During operation a substantial portion of the distilling vapors is caused to impinge upon that side of the vanes farthest from the vaporizing surface.

In the following description I have given several of the preferred embodiments of my invention, but it is to be understood that these are set forth for the purpose of illustration and not in limitation thereof.

In the accompanying drawings I have illustrated various embodiments of my invention wherein like members refer to like parts and wherein:

Fig. 1 is a vertical section of an improved still embodying the principles of my invention;

Fig. 2 is a horizontal section taken on line 2—2 of Fig. 1;

Fig. 3 is a fragmentary view of the rotating fanlike member partly in section and taken on line 3—3 of Fig. 2;

Figure 4:
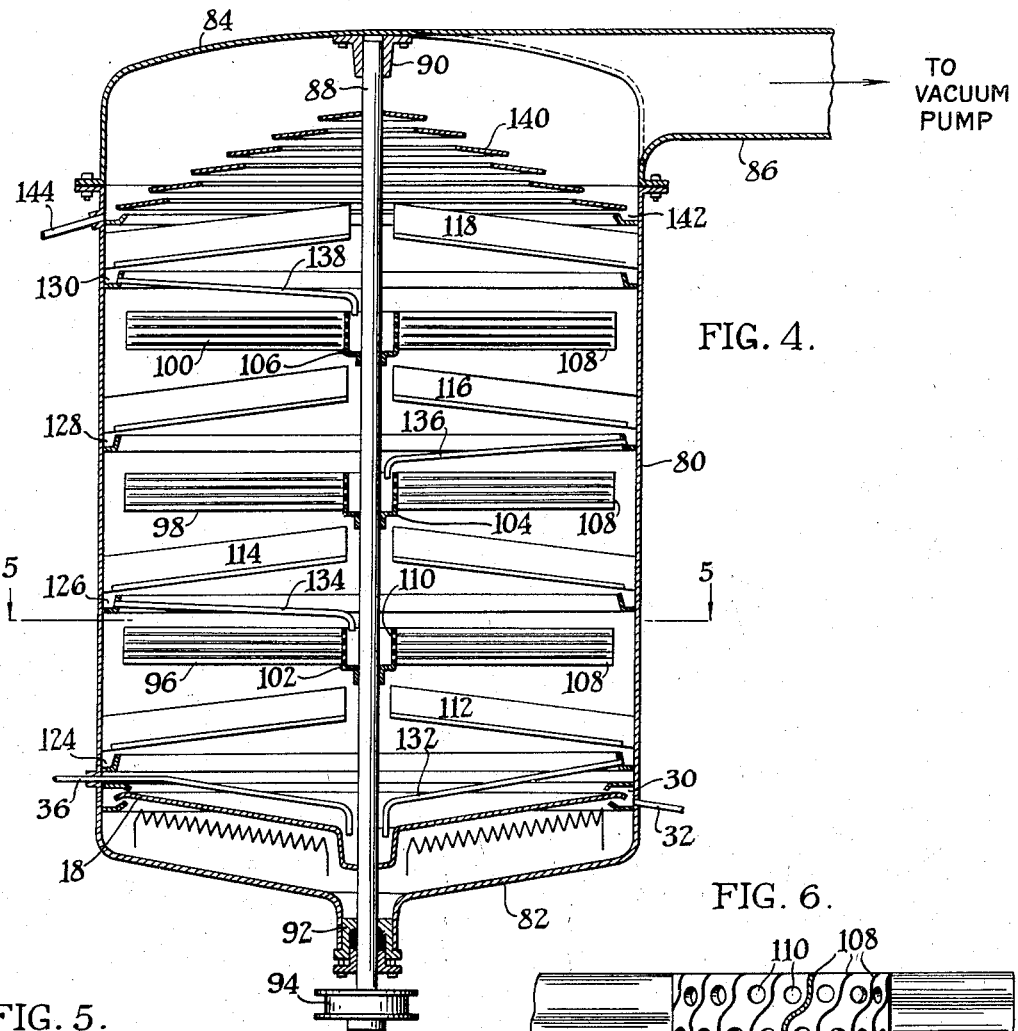
Fig. 4 is a vertical section of a modification of the apparatus illustrated in Fig. 1 in which additional fractionation is accomplished by alternate stationary and rotating members.

Referring to Figs. 1, 2 and 3 numeral 6 designates a cylindrical still casing provided with an integral base plate 8 and a removable top plate 10 with which it makes a gas tight contact by means of flange 12 and gasket 14. Numeral 16 indicates evacuation conduits connected to backing pumps (not shown). Numeral 18 indicates a circular rotatable vaporizing surface provided at the center with a deeply depressed cup 20 to the center of which is attached a shaft 22 by means of flange 24. Shaft 22 is housed in gas tight bearing 26 and is provided with a driving pulley 28. Numeral 30 designates an annular gutter which surrounds the periphery of vaporizing surface 18 to which gutter is connected the withdrawal conduit 32. Numeral 34 designates an electrical resistance for heating the vaporizing surface 18 to distillation temperature by means of radiant heat. Numeral 36 indicates a conduit for introducing distilland onto the approximate center of plate 18.

Numeral 38 designates a shaft which is rigidly mounted upon the central portion of casing cover 10 by means of bearing 40 and packed gland 42. Numeral 44 designates a hub integral with the end of shaft 38 to which is attached a plurality of radial vanes 46. These vanes are mounted on hub 44 in much the same manner as the blades of an air-circulating fan. They are oblique to the vaporizing surface 18 and during operation the shaft 38, hub 44 and vanes 46 are rotated so that the edge of the vanes 46 nearest the vaporizing surface is the leading edge of the vane. Numeral 48 designates a driving pulley integral with the opposite end of shaft 38. The outside periphery of the rotating fanlike member extends into a gutter formed by flanges 50 and 52 mounted upon the inside walls of casing 6. These annular flanges extend toward the center of the casing a sufficient distance so that liquid thrown from the radial vanes is caught and delivered into withdrawal conduit 54. Numeral 56 designates an annular gutter formed by flange 58 integral with the upper inside wall of casing 6. Liquid collecting in gutter 56 is withdrawn by way of conduit 60.

Figure 5:
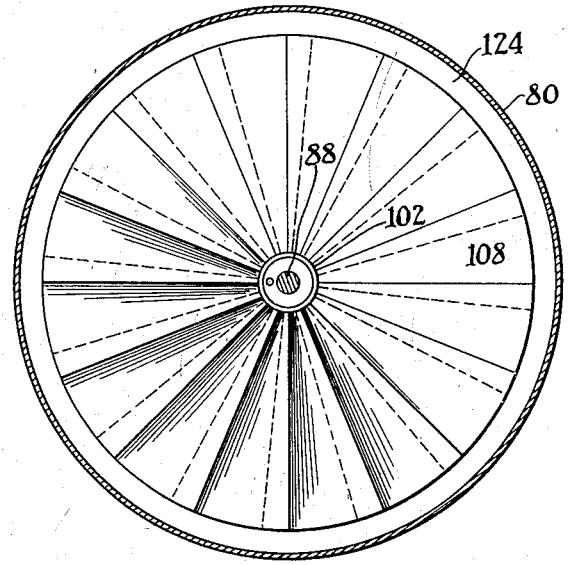
Fig. 5 is a horizontal section of the apparatus shown in Fig. 4 taken on line 5—5.
Figure 6:
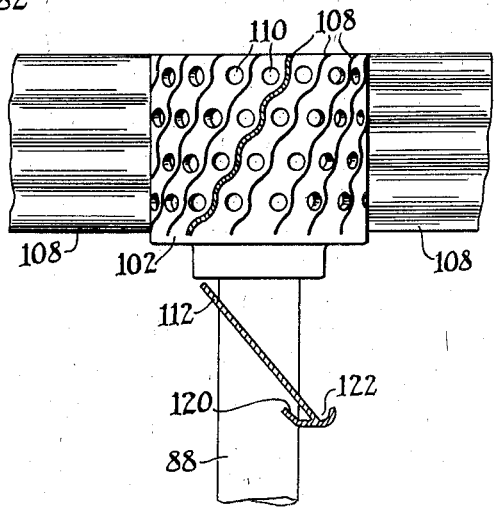
Fig. 6 is a fragmentary perspective view partially in section of the hub of one of the rotating fanlike members illustrated in Fig. 4.

Referring to Figs. 4, 5 and 6, numeral 80 designates a cylindrical casing provided with an integral base plate 82 and a removable cover 84. Numeral 86 indicates a conduit integral with cover 84 which is connected to evacuating pumps (not shown). Numeral 88 designates a shaft which runs the length of still casing 80 which is housed in bearing 90 and gas tight bearing 92. The external end of the shaft is provided with a driving pulley 94. The shaft carries a plurality of integral rotating members the lowest being a vaporizing plate 18 analogous to that illustrated in Fig. 1. The other rotating members indicated by the numerals 96, 98 and 100 are held to the shaft 88 by hubs 102, 104 and 106. To these hubs are connected a plurality of oblique radial vanes indicated in Fig. 6 by the numeral 108. These vanes are corrugated and in the hubs 102, 104 and 106 there are holes or perforations 110 leading into the lower part of each corrugation.

Numerals 112, 114, 116 and 118 designate stationary members made up of a plurality of radial vanes which are mounted upon the inside wall of casing 80. The vanes of these stationary members are oblique to the vanes of the rotating members 96, 98 and 100 so that vapors flung from the rotating vanes impinge upon the side of the stationary vanes opposite from the rotating member. Referring particularly to Fig. 6 it will be noted that the stationary members such as 112 are provided at the base of each vane with collecting gutters 120 and 122. Also, it will be noted that stationary members 112, 114, 116 and 118 have the shape of a squat cone so that liquid collecting thereon tends to flow toward the walls of casing 80. Numerals 124, 126, 128 and 130 specify annular gutters mounted upon the inside wall of casing 80 in such a position that liquid draining from stationary members 112, 114, 116 and 118 respectively flows therein. Numeral 132 indicates a conduit through which liquid collecting in gutter 124 flows to the center of vaporizing plate 18. Conduits 134, 136 and 138 serve to deliver liquid collecting in gutters 126, 128 and 130 respectively to hubs 102, 104 and 106.

Numeral 140 designates a baffle made up of a plurality of overlapping annular members each of which is slanted at a slight angle so as to shed liquid onto the next lowest collar of the element. The spaces between these baffles permits non-condensable gasses to flow from the still into evacuating conduit 86. Numeral 142 designates an annular gutter into which liquid from 140 drains and conduit 144 serves to withdraw this liquid from the still.

During operation of the apparatus illustrated in Fig. 1 shaft 22 is caused to rotate counterclockwise and shaft 38 is caused to rotate in a clockwise direction. The still is evacuated by means of pumps connected to conduits 16. Vaporizing surface 18 is heated to distillation temperature by radiant heaters 34. Liquid to be distilled is introduced onto the center of vaporizing plate 18 by way of conduit 36. This liquid is caused to flow over the surface of 18 in the form of a thin film by centrifugal force. This film is heated to distillation temperature and vapors are given off. Most of these molecules of vapor pass in the general direction of the rotating vanes 46. The rotation of shaft 38 is at such a speed that these molecules of vapor are caused to impinge upon the side of vanes 46 farthest from the vaporizing plate 18; i. e., upon the top side of the vanes. These vapors are partially condensed and heat contained in the vapors is imparted to the vanes so that they are maintained at a relatively elevated temperature compared with condensing surfaces in conventional high vacuum unobstructed path stills. Some of the condensed vapors are revaporized by the heat. This is particularly true of the molecules having the highest vapor pressure. There is thus a preferential condensation of heavier molecules and a preferential vaporization of lighter molecules. The heaviest molecules remain in liquid condition and are flung into the space between flanges 50 and 52 and are withdrawn as liquid through conduit 54. The lighter vapors which are either uncondensed on vanes 46 or which are revaporized therefrom pass into contact with the top of the still 10 which is air cooled. These vapors are thus condensed and flow by gravity into gutter 56 and are withdrawn from the still through conduit 60.

The rotating vanes 46 should rotate at a speed such that a substantial portion of the molecules vaporized from plate 18 impinge upon the side of the vanes farthest from the vaporizing surface 18. In this way it is possible to utilize the improved fractionating effect of a hot condenser and yet avoid the difficulties heretofore encountered in connection with a hot condenser such as non-condensation of the more volatile components and their undesirable presence in the space between the vaporizing and condensing surfaces. These volatile molecules are caused to impinge upon the hot condensing vanes but upon the side away from the vaporizing surface. They vaporize chiefly toward the condensing surface and are thus substantially prevented from exerting a harmful effect upon distilling molecules. The speed of rotation of the vanes should be a substantial fraction of the velocity of the distilling molecules. The actual speed of rotation will depend upon the size of the apparatus and the depth of the radial vanes; i. e., the distance between the lower and upper edges of the vanes During operation of the apparatus illustrated in Figs. 4, 5 and 6, liquid to be distilled is introduced through conduit 36. Vaporizing surface 18 is caused to rotate by force supplied to shaft 94 and is heated to distillation temperature by heating element 34. The still is evacuated by evacuating pumps connected to conduits 86. The distilland is caused to flow over heated plate 18 by centrifugal force and the vapors thus produced have imparted to them a directional component corresponding to the direction of rotation of the vaporizing surface. The vanes of element 112 are positioned oblique to vaporizing surface 18 and vaporizing surface 18 is rotated in a direction such that the directional component imparted to the vapors will cause them to impinge upon that side of the radial vanes of element 112 opposite from vaporizing surface 18. These vapors will be partially condensed; i. e. the highest boiling portions of these vapors will condense and the heat will be imparted to the radial vanes. This heat will cause the lighter components to vaporize. The condensate will drain to the walls of casing 80 along the gutters 120 and 122, at the bottom of each vane. This condensate then collects in gutter 124, flows through conduit 132, back onto the center of vaporizing surface 18. Here this condensate is redistilled to remove lower boiling fractions and the process as described is repeated.

Vapors which either are not condensed on vanes 112 or which are condensed and revaporized therefrom then pass to the upper part of the apparatus where they impinge upon rotating vanes 96. These vanes are oblique to the direction of flow of these vapors and the rotation causes the vapors to impinge upon the side of the vanes opposite from the next lowest fanlike member 112. Here again part of the vapors are condensed, namely, the higher boiling portions and these condensed vapors are flung by centrifugal force to the wall of casing 80 and flow by gravity into gutter 124. Uncondensed vapors or vapors produced by revaporization of intermediate fractions by the heat derived from the vapors condensed on 96 are then flung by the action of the radial vanes in 96 against the sides of stationary vanes 114 opposite from element 96. It is apparent that vanes making up element 114 are oblique to element 96 and so positioned that the centrifugal velocity imparted to the vapors causes them to impinge upon the side of vanes 114 away from element 96.

On stationary vanes 114 the same fractionating effect takes place; i. e. lower boiling fractions are vaporized and pass upward and impinge upon rotating element 98; condensed portions are caused to flow by gravity into gutter 126 from which they flow through conduit 134 into the hub 102 of element 96. This liquid which is returned to the hub 102 represents high boiling portions and is caused to flow by centrifugal force through holes 110 on to the corrugated surface of radial vanes 108 making up the element 96. This liquid impinges upon the vapors derived from stationary element 112 and efficient interchange and fractionation thus takes place.

The same action takes place as the vapors flow upward through the apparatus and finally a very pure fraction is condensed upon element 140. This element is cooled by radiation from the air cooled cover 84. If desired water cooling conduits can be attached to these elements. The condensate is shed from one collar to another and finally flows into gutter 142 and is withdrawn from the still by way of conduit 144.

It is thus seen that this apparatus makes possible repeated fractionation in a high vacuum still without substantial obstruction to the flow of vapors therethrough. Also it permits the utilization of what is in effect a warm or hot condensing surface without the disadvantages thereof, namely, interruption to the flow of vapors from the vaporizing surface normally caused by uncondensed molecules present in the distilling space as the result of a conventional hot or warm condensing surface.

While my invention is preferably employed in connection with a rotating, vaporizing surface, a gravity flow or stationary vaporizing surface such as a pot vaporizer may be utilized. When a stationary or pot vapor source is used the rotating fractionating vanes should be contiguous to the vapor source as in Fig. 1. Alternate stationary and rotating vanes may then be used in the upper part of the column if desired. I prefer that both the vaporizer and fractionating vanes rotate since it is then unnecessary to use such high speeds of rotation for the rotating vanes 46. In other words, the vaporizing surface can be rotated in a direction opposite to that of the contiguous rotating vanes 46 and it is then the differential between the two surfaces which determines the effective speed of the vanes 46.

As a specific example, when a glyceride oil is distilled the molecules at the temperature of vaporization have a speed of about 1000 to 2000 feet per second. If the vaporizing surface 18 is three feet in diameter and is rotated at 3000 R. P. M. and the rotating vanes 46 are three and a half feet in diameter and are rotating at 5000 R. P. M. there is a speed differential of 8000 R. P. M. or a peripheral speed differential of 80,000 feet per minute. In the middle of the distilling zone there will be an average speed differential of 50,000 feet a minute or approximately 850 feet a second. This means that if the vanes 46 are two feet high at this point a substantial proportion of the molecules of vapor will strike the upper surfaces of these vanes.

It is contemplated that the vanes shall be at an elevated temperature during the distillation. However, they will not be at a temperature as high as the distillation temperature. The temperature can be controlled by controlling the rate of distillation. This will effectively vary the temperature of the vanes and will enable control of the temperature so that the desired amount of liquid condensed on the vanes 46 is re-evaporated and passes to air-cooled condenser 10. If desired the reflux collecting on the rotating vanes of Fig. 4 can be withdrawn as separate fractions. Alternatively this reflux can be cooled before return to the next lowest rotating vanes to effect temperature control. Also the column shown in Fig. 6 can be partially or completely insulated or heated to improve fractionation and temperature control.

In addition to the improved fractionation I have found that my invention also reduces heat losses. Organic oils such as are usually distilled in a high vacuum still are absorbers of heat. The construction described herein has the outstanding advantage that the film of oil is not condensed on a surface directly opposite to the heat vaporizing surface as heretofore. On the contrary, the film is condensed on the side of the vane opposite to the vaporizing surface so that heat absorption, which is a direct loss of heat, is substantially avoided. I prefer to maintain the vaporizing surface and the rotating vanes highly polished to further avoid heat losses. Also, heat losses are markedly reduced due to the fact that the rotating vanes are at an elevated temperature. The heat loss between vaporizing plate 18 and rotating vanes 46 is obviously determined by the temperature difference between the two surfaces.

Other advantages of the construction are that the still is self-evacuating. Residual gases in the space between the vaporizing and condensing surfaces are removed by the rotating vanes and are caused to pass into the evacuating conduit. Also entrainment of distilland by spraying from the vaporizing to the condensing surface is substantially prevented.

What I claim is:

1. High vacuum distillation apparatus comprising in combination within a closed system a rotatable vaporizing surface, means for heating the vaporizing surface, means for introducing distilland on to the approximate center of the vaporizing surface, means for removing undistilled residue from the periphery of the vaporizing surface, a condensing surface, means for removing condensate from the condensing surface, a rotatable member composed of a plurality of radial vanes which vanes are oblique to the vaporizing surface, positioned between the vaporizing and condensing surfaces in such a manner that the axis of rotation of the rotatable member is substantially perpendicular to the vaporizing surface.

2. High vacuum distillation apparatus comprising in combination within a closed system a rotatable vaporizing surface, means for heating the vaporizing surface, means for introducing distilland on to the approximate center of the vaporizing surface, means for removing undistilled residue from the periphery of the vaporizing surface, a condensing surface, means for removing distillate from the condensing surface, a rotatable fanlike member composed of a plurality of radial vanes oblique to the vaporizing surface positioned between the vaporizing and condensing surfaces, said vaporizing and condensing surfaces being separated by substantially unobstructed space except for the rotatable member, and means for collecting liquid which condensed on said rotatable fanlike member.

3. High vacuum distillation apparatus comprising in combination within a closed system a rotatable vaporizing surface, means for heating the vaporizing surface, means for introducing distilland on to the approximate center of the vaporizing surface, means for removing undistilled residue from the periphery of the vaporizing surface, a condensing surface, means for removing distillate from the condensing surface, a rotatable fanlike member composed of a plurality of radial vanes oblique to the vaporizing surface and positioned between the vaporizing and condensing surfaces said vaporizing and condensing surfaces being separated by substantially unobstructed space except for the rotatable member, means for collecting a liquid which condenses on said rotatable fanlike member and means for returning this collected liquid to the vaporizing surface.

4. High vacuum distillation apparatus comprising in combination within a closed system a rotatable vaporizing surface, means for heating the vaporizing surface, means for introducing distilland on to the approximate center of the vaporizing surface, means for removing undistilled residue from the periphery of the vaporizing surface, a condensing surface, means for removing distillate from the condensing surface, a rotatable fanlike member composed of a plurality of radial vanes oblique to the vaporizing surface which fanlike member is positioned between the vaporizing and condensing surfaces so that its axis of rotation is substantially the same as the axis of rotation of the vaporizing surface, and means for collecting liquid which condenses on the side of the rotatable fanlike member opposite from the vaporizing surface, said vaporizing and condensing surfaces being separated by substantially unobstructed space except for the fanlike member.

5. Fractionating vacuum distillation apparatus comprising in combination a rotatable vaporizing surface, means for introducing liquid near the center of said surface, means for removing undistilled residue from the periphery of said surface, a condensing surface, means for removing condensate from the condensing surface, a plurality of spaced members positioned between the vaporizing and condensing surfaces said members being constructed of radial vanes with spaces therebetween, the vanes of the members being so positioned that during operation the vapors impinge upon the opposite side of the vanes of the next member nearest the condensing surface.

6. Fractionating vacuum distillation apparatus comprising in combination a rotatable vaporizing surface, means for introducing liquid near the center of said surface, means for removing undistilled residue from the periphery of said surface, a condensing surface, means for removing condensate from the condensing surface, a plurality of opposite and spaced, alternate stationary and rotatable members positioned between the vaporizing and condensing surfaces, said members being constructed of radial vanes with spaces therebetween, the vanes of the members being so positioned that the directional component imparted to the vapors by the rotating members causes the vapors to impinge upon the opposite side of the vanes of the next member nearest the condensing surface.

7. Fractionating vacuum distillation apparatus comprising in combination a rotatable vaporizing surface, means for introducing liquid near the center of said surface, means for removing undistilled residue from the periphery of said surface, a condensing surface, means for removing condensate from the condensing surface, spaced stationary and rotating members opposite each other and positioned between the vaporizing and condensing surfaces said members being constructed of radial vanes with spaces therebetween, the vanes of the members being so positioned that the directional component imparted to the vapors by the rotating members during operating causes the vapors to impinge upon the opposite side of the vanes of the next member nearest the condensing surface said vaporizing and condensing surfaces being separated by substantially unobstructed space except for the vane members positioned therebetween.

8. Fractionating vacuum distillation apparatus comprising in combination a rotatable vaporizing surface, means for introducing liquid near the center of said surface, means for removing undistilled residue from the periphery of said surface, a condensing surface, means for removing condensate from the condensing surface, a plurality of opposite end spaced alternate stationary and rotatable members, positioned between the vaporizing and condensing surfaces, said members being constructed with radial vanes with spaces therebetween the vanes of the members being so positioned that the directional component imparted to the vapors by the rotating members during operation caused the vapors to impinge upon the opposite side of the vanes of next member nearest the condensing surface, and means for collecting condensate from the vanes of the rotatable members and means for distributing this condensate upon the vanes of the next member nearest the vaporizing surface.

KENNETH C. D. HICKMAN.